(12) United States Patent
Tang

(10) Patent No.: US 8,855,919 B2
(45) Date of Patent: *Oct. 7, 2014

(54) NAVIGATION SYSTEM WITH DESTINATION-CENTRIC EN-ROUTE NOTIFICATION DELIVERY MECHANISM AND METHOD OF OPERATION THEREOF

(75) Inventor: Ky Tang, Milpitas, CA (US)

(73) Assignee: Telenav, Inc., Sunnyvale, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 12/959,334

(22) Filed: Dec. 2, 2010

(65) Prior Publication Data

US 2012/0143501 A1 Jun. 7, 2012

(51) Int. Cl.
*G01C 21/00* (2006.01)
*G01C 21/36* (2006.01)
*G01C 21/34* (2006.01)

(52) U.S. Cl.
CPC ........ *G01C 21/3682* (2013.01); *G01C 21/3476* (2013.01); *G01C 21/3697* (2013.01)
USPC ......... 701/410; 455/456.3; 701/465; 701/445

(58) Field of Classification Search
USPC ................. 701/400, 410, 411, 425, 445, 465; 455/456.3
See application file for complete search history.

(56) References Cited

U.S. PATENT DOCUMENTS

| | | | |
|---|---|---|---|
| 5,931,888 A * | 8/1999 | Hiyokawa | 701/428 |
| 6,385,592 B1 | 5/2002 | Angles et al. | |
| 6,401,034 B1 * | 6/2002 | Kaplan et al. | 701/416 |
| 6,452,498 B2 | 9/2002 | Stewart | |
| 6,498,982 B2 * | 12/2002 | Bellesfield et al. | 701/533 |
| 6,571,279 B1 | 5/2003 | Herz et al. | |
| 6,895,387 B1 | 5/2005 | Roberts et al. | |
| 6,999,875 B2 * | 2/2006 | Tu | 701/538 |
| 7,668,649 B2 * | 2/2010 | Onishi | 701/426 |
| 7,904,238 B2 * | 3/2011 | Nesbitt | 701/420 |
| 7,925,438 B2 * | 4/2011 | Lo | 701/436 |
| 8,036,822 B2 * | 10/2011 | Ho | 701/465 |
| 8,072,974 B1 * | 12/2011 | Jain et al. | 370/389 |
| 8,126,643 B2 * | 2/2012 | Lehtiniemi et al. | 701/425 |
| 8,140,389 B2 * | 3/2012 | Altberg et al. | 705/14.41 |
| 8,208,941 B2 * | 6/2012 | Holm et al. | 455/456.1 |
| 8,260,647 B2 * | 9/2012 | Scott et al. | 705/7.13 |
| 8,285,481 B2 * | 10/2012 | De Silva et al. | 701/409 |

(Continued)

FOREIGN PATENT DOCUMENTS

EP          1752919 A1 *  2/2007
JP     2010244121 A  * 10/2010

OTHER PUBLICATIONS

International Search Report for PCT Application No. PCT/US2011/057848 dated Mar. 9, 2012.
U.S. Appl. No. 12/959,339, filed Dec. 2, 2010, Tang.

*Primary Examiner* — Tuan C. To
(74) *Attorney, Agent, or Firm* — IP Investment Law Group

(57) ABSTRACT

A method of operation of a navigation system includes: receiving an entry for a destination; identifying a category of interest for the destination; generating a route to the destination; recognizing a traveling context for traveling along the route to the destination; and generating an en-route notification based on matching a delivery profile to the category of interest for traveling within the traveling context for displaying on a device.

26 Claims, 9 Drawing Sheets

(56) References Cited

U.S. PATENT DOCUMENTS

| | | | | |
|---|---|---|---|---|
| 8,340,895 B2* | 12/2012 | Robinson | | 701/400 |
| 8,346,477 B2* | 1/2013 | Harding | | 701/426 |
| 8,359,020 B2* | 1/2013 | Lebeau et al. | | 455/420 |
| 8,463,424 B2* | 6/2013 | Dicke | | 700/209 |
| 8,478,642 B2* | 7/2013 | Dey et al. | | 705/14.4 |
| 8,626,439 B2* | 1/2014 | Zhou | | 701/423 |
| 8,645,061 B2* | 2/2014 | Newson et al. | | 701/469 |
| 2002/0004700 A1* | 1/2002 | Klein | | 701/200 |
| 2003/0158658 A1 | 8/2003 | Hoever et al. | | |
| 2007/0218891 A1 | 9/2007 | Cox | | |
| 2008/0032703 A1 | 2/2008 | Krumm et al. | | |
| 2008/0139181 A1 | 6/2008 | Lokshin | | |
| 2009/0150167 A1* | 6/2009 | Patenaude et al. | | 705/1 |
| 2009/0203387 A1 | 8/2009 | Wold et al. | | |
| 2009/0239552 A1 | 9/2009 | Churchill et al. | | |
| 2009/0327151 A1 | 12/2009 | Carlson et al. | | |
| 2010/0168996 A1* | 7/2010 | Bourque et al. | | 701/200 |
| 2010/0280748 A1 | 11/2010 | Mundinger et al. | | |
| 2011/0055770 A1* | 3/2011 | Hed et al. | | 715/854 |

* cited by examiner

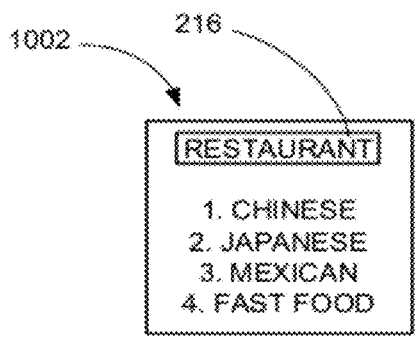

NAVIGATION SYSTEM WITH DESTINATION-CENTRIC EN-ROUTE NOTIFICATION DELIVERY MECHANISM AND METHOD OF OPERATION THEREOF

CROSS-REFERENCE TO RELATED APPLICATION(S)

The present application contains subject matter related to a concurrently filed U.S. Patent Application by Ky Tang entitled "ADVERTISEMENT DELIVERY SYSTEM WITH DESTINATION-CENTRIC ADVERTISEMENT DELIVERY MECHANISM AND METHOD OF OPERATION THEREOF." The related application is assigned to TeleNav, Inc. and is identified by Ser. No. 12/959,339. The subject matter thereof is incorporated herein by reference thereto.

TECHNICAL FIELD

The present invention relates generally to a navigation system, and more particularly to a system with destination-centric en-route notification delivery mechanism.

BACKGROUND ART

Modern portable consumer and industrial electronics, especially client devices such as navigation systems, cellular phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system that cannot provide relevant notification that relates to the target destination has become a paramount concern for the consumer. A navigation system that provides irrelevant notification can lead to unsafe operation of the vehicle and can decrease the benefit of using the tool.

Thus, a need still remains for a navigation system with destination-centric en-route notification delivery mechanism that can tailor a notification that meets the type of travel the user undertakes and matches to the target destination where the user desires to reach. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving an entry for a destination; identifying a category of interest for the destination; generating a route to the destination; recognizing a traveling context for traveling along the route to the destination; and generating an en-route notification based on matching a delivery profile to the category of interest for traveling within the traveling context for displaying on a device.

The present invention provides a navigation system, including: a first user interface for receiving an entry for a destination; a destination determinator module, coupled to the first user interface, for identifying a category of interest for the destination; a route generator module, coupled to the destination determinator module, for generating a route to the destination; a traveling context recognizer module, coupled to the route generator module, for recognizing a traveling context for traveling along the route to the destination; and an en-route notification generator module, coupled to the traveling context recognizer module, for generating an en-route notification based on matching a delivery profile to the category of interest for traveling within the traveling context for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 7 shows an example of an acceptance trend.

FIG. 8 shows an example of a rejection trend.

FIG. 9 shows an example of a non-response trend.

FIG. 10 shows an example of a ranking of the category of interest.

BEST MODE FOR CARRYING OUT THE INVENTION

Figure 1:
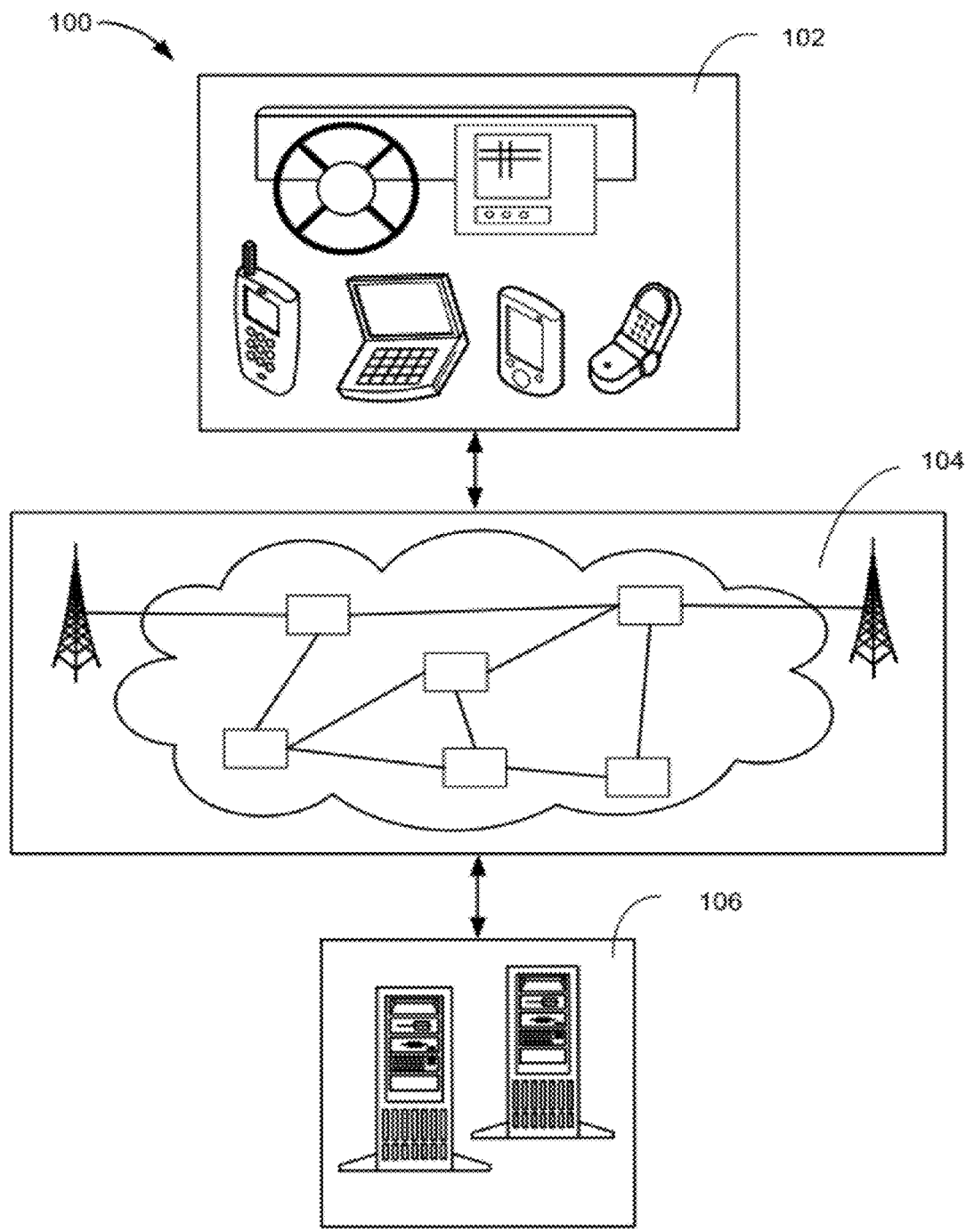
FIG. 1 is a navigation system with destination-centric en-route notification delivery mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with destination-centric en-route notification delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
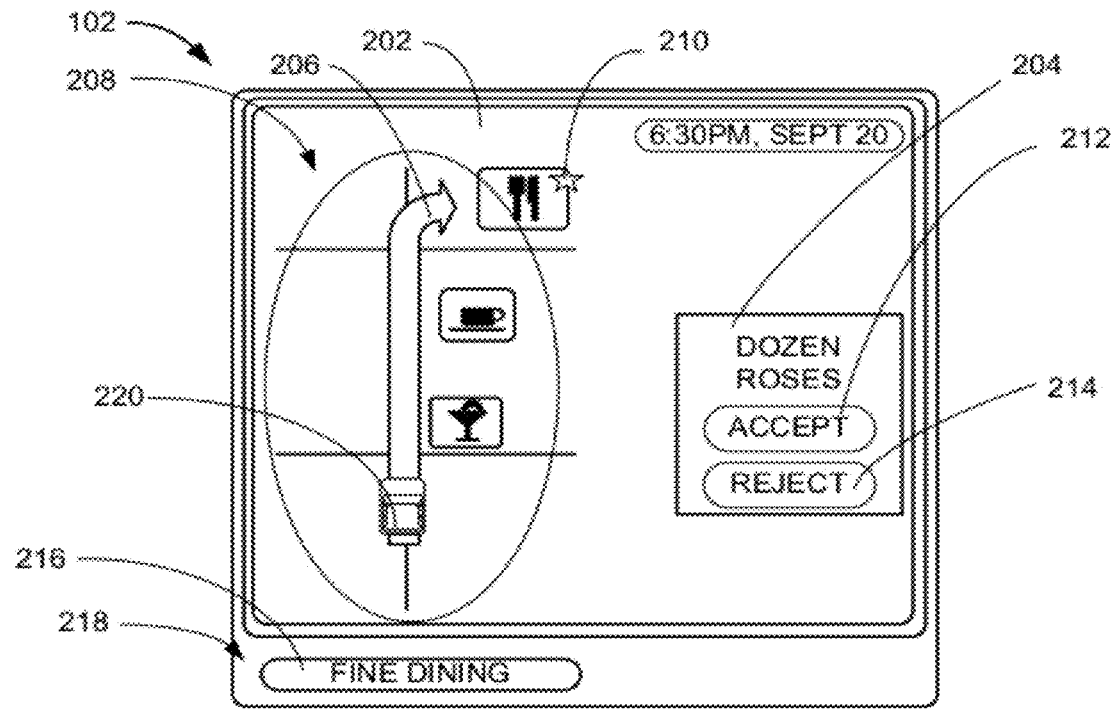
FIG. 2 shows a first example of a display interface of the first device.

Referring now to FIG. 2, therein is shown a first example of a display interface 202 of the first device 102. The display interface 202 can display en-route notifications 204 while the user travels along a route 206 within a traveling context 208 to reach a destination 210. Furthermore, the term "user" used hereinafter refers to the user of the navigation system 100, and the term "vehicle" will be denoted as the vehicle with the navigation system 100.

The en-route notifications 204 are defined as visual messages, audio messages, or a combination thereof delivered to the user traveling on the vehicle with the navigation system 100. The en-route notifications 204 can include alerts, bulletins, communications, warnings, or a combination thereof.

The en-route notifications 204 can display a notification acceptance 212, a notification rejection 214, or a combination thereof. The notification acceptance 212 is defined as the functionality for the user to accept the en-route notifications 204. The notification acceptance 212 can be performed by the user selecting the notification acceptance 212, stating an oral command to accept the en-route notifications 204, or a combination thereof. The notification rejection 214 is defined as the functionality for the user to reject the en-route notifications 204. The functionally for the notification rejection 214 can be performed by the user selecting the notification rejection 214, stating an oral command to reject the en-route notifications 204, or a combination thereof.

The route 206 is defined as the travel path for the vehicle operated by the user to reach the destination 210. The destination 210 is defined as the target geographic location where the user will end his or her travel.

The destination 210 can be classified by a category of interest 216. The category of interest 216 is defined as the type of the destination 210. For example, McDonald's™ can be the destination 210. The category of interest 216 for McDonald's™ can be a restaurant. As a different example, Whole Foods Market™ can be the destination 210. The category of interest 216 for Whole Foods Market™ can be a grocery store.

The user, the navigation system 100, or a combination thereof can make an entry 218 for the destination 210, the category of interest 216, or a combination thereof to the navigation system 100. For example, the entry 218 can be made by manually typing the destination 210, giving an oral command for the destination 210, selecting the destination 210 from a list, or a combination thereof.

The traveling context 208 is defined as facts, interests, circumstances, or a combination thereof that exists while the vehicle with the navigation system 100 travels along the route 206 to reach the destination 210. Some examples of the traveling context 208 as facts can include the time of day, the category of interest 216 of the destination 210, or a combination thereof. For a further example, the destination 210 can be a restaurant named the French Laundry™. The category of interest 216 for French Laundry can be a three Michelin™ starred restaurant in Napa Valley, Calif. The time can be 6:30 PM. The date can be September 20, a fiancée's birthday. Based on the mentioned set of facts, the navigation system 100 can recognize the traveling context 208 as a special dinner occasion for the user. Furthermore, based on the traveling context 208, the navigation system 100 can deliver the en-route notifications 204 representing "dozen roses" to the user. The details regarding the navigation system 100 recognizing the traveling context 208 and delivering the en-route notifications 204 will be discussed later.

A current location 220 is defined as the current geographic location of the user of the navigation system 100. The navigation system 100 can generate the route 206 from the current location 220 to the destination 210.

Figure 3:
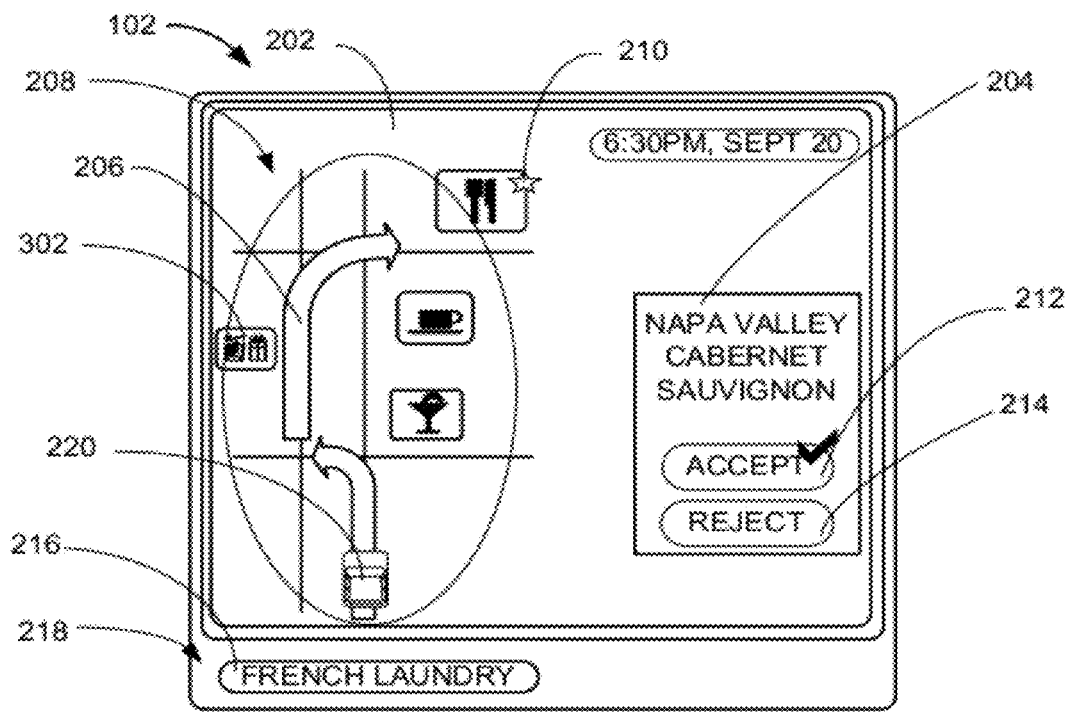
FIG. 3 shows a second example of the display interface of the first device.

Referring now to FIG. 3, therein is shown a second example of the display interface 202 of the first device 102. The second example illustrates a situation when the user accepts the en-route notifications 204 by selecting the notification acceptance 212.

For example, the destination 210 can be French Laundry™. One of the en-route notifications 204 can display a visual message for "Napa Valley wine for cabernet sauvignon." The user can accept one of the en-route notifications 204 by selecting the notification acceptance 212. Based on the notification acceptance 212, the navigation system 100 can update the route 206 to reach an intermediate stop 302 prior to reaching the destination 210.

The intermediate stop 302 is defined as the geographic location where the user can stop by prior to reaching the destination 210 after selecting the notification acceptance 212. For example, the user can stop by a liquor store named BevMo!™ as the intermediate stop 302 to purchase the cabernet sauvignon prior to having dinner at French Laundry™.

Figure 4:
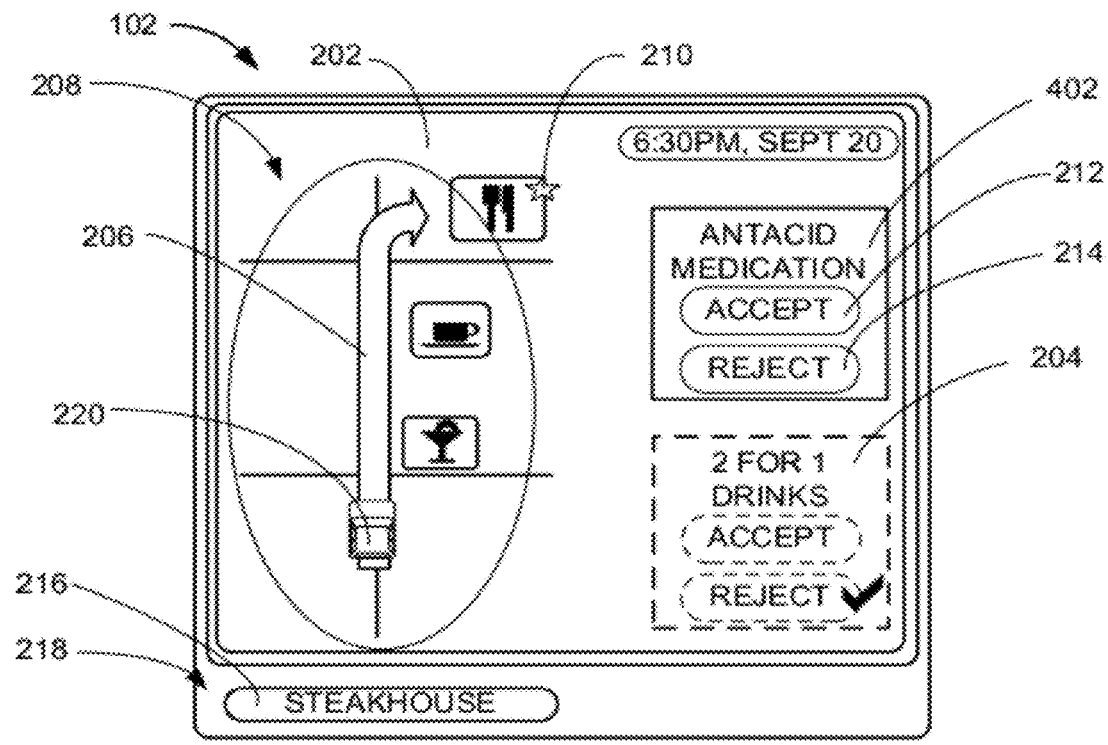
FIG. 4 shows a third example of the display interface of the first device.

Referring now to FIG. 4, therein is shown a third example of the display interface 202 of the first device 102. The third example illustrates a situation when the user rejects the en-route notifications 204 by selecting the notification rejection 214. For example, the rejected message for the en-route notifications 204 can be displayed as dotted lines, no display at all, or a combination thereof.

The display interface 202 can display an updated notification 402 after the user selected the notification rejection 214. The updated notification 402 is defined as the revised or updated version of the en-route notifications 204.

For example, the navigation system 100 can deliver one of the en-route notifications 204 as "2 for 1 drink special." However, the user had made the entry 218 for the category of interest 216 representing "steakhouse." Hence, the user can be uninterested in receiving a message for "2 for 1 drink special." Therefore, the user can select the notification rejection 214 for the message for the en-route notifications 204 displaying "2 for 1 drink special."

Subsequently, the navigation system 100 can update the en-route notifications 204 based on the notification rejection 214 by displaying the updated notification 402 representing the message for "antacid medication." The navigation system 100 can display the updated notification 402 for "antacid medication," because the user can be interested in taking antacid medication after eating a steak to ease his or her heartburn. The updated notification 402 can also include the notification acceptance 212, the notification rejection 214, or a combination thereof. The details regarding the generation of the updated notification 402 will be discussed later.

Figure 5:
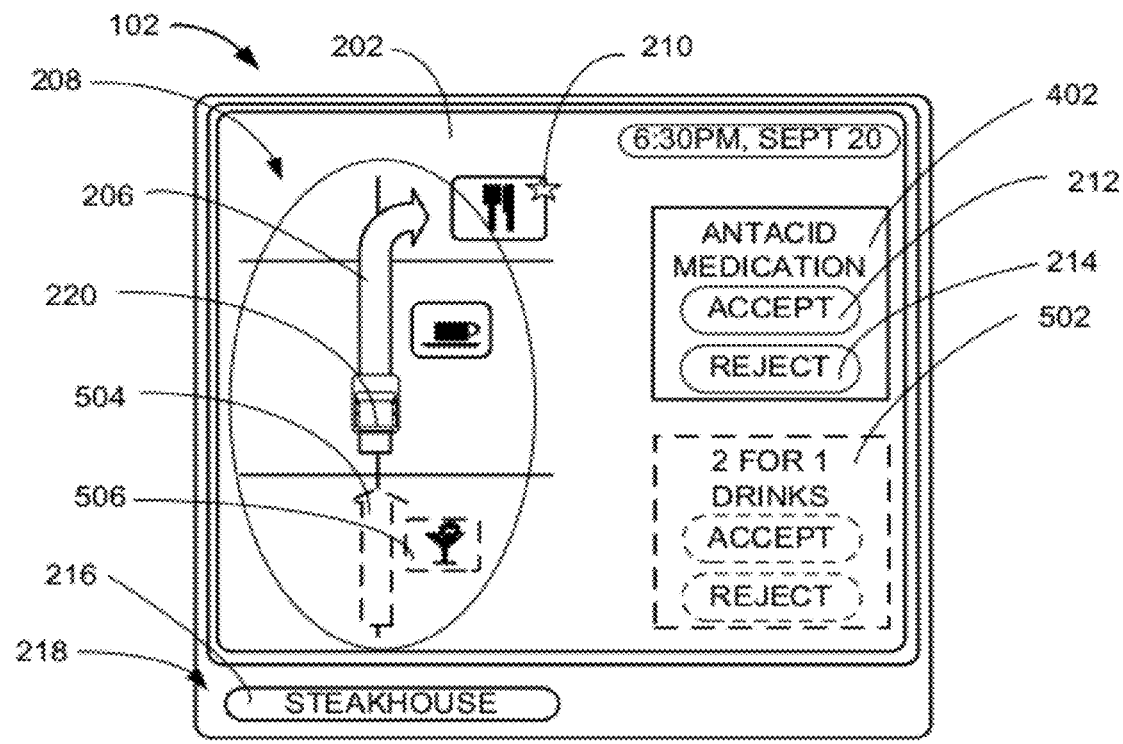
FIG. 5 shows a fourth example of the display interface of the first device.

Referring now to FIG. 5, therein is shown a fourth example of the display interface 202 of the first device 102. The fourth example illustrates a situation when the user responds to the en-route notifications 204 by a non-response 502.

The non-response 502 is defined as a non-selection or an omission of action by the user to the offering of the en-route notifications 204 by the navigation system 100. For example, the user can respond by the non-response 502 by neither selecting the notification acceptance 212 nor the notification rejection 214. For a further example, the non-response 502 can represent the user ignoring the en-route notifications 204.

The navigation system 100 can detect the non-response 502 for the en-route notifications 204 based on an occurrence 504 of an event 506. The event 506 is defined as an activity at a given place and time. The occurrence 504 is defined as an instance of the event 506.

For example, a sports bar along the route 206 to the destination 210 can have a drink special. The display interface 202 can display one of the en-route notifications 204 as "2 for 1 drink special" to the vehicle prior to reaching the sports bar. The event 506 can represent a situation when the user ignores one of the en-route notifications 204 for "2 for 1 drink special" and passes by the sports bar having the drink special. The occurrence 504 can represent when the vehicle actually passed by the sports bar and have not made a U-turn, hence making the en-route notifications 204 for that sports bar irrelevant to the user.

The en-route notifications 204, which the navigation system 100 had detected the non-response 502 for the occurrence 504 of the event 506, can be displayed as dotted lines, no display at all, or a combination thereof. The sports bar passed by the user can be displayed as dotted lines, no display at all, or a combination thereof. A portion of the route 206 that passed by the sports bar can be displayed as dotted lines, no display at all, or a combination thereof. The navigation system 100 can update the en-route notifications 204 based on the non-response 502 by displaying the updated notification 402. The details regarding the generation of the updated notification 402 will be discussed later.

Figure 6:
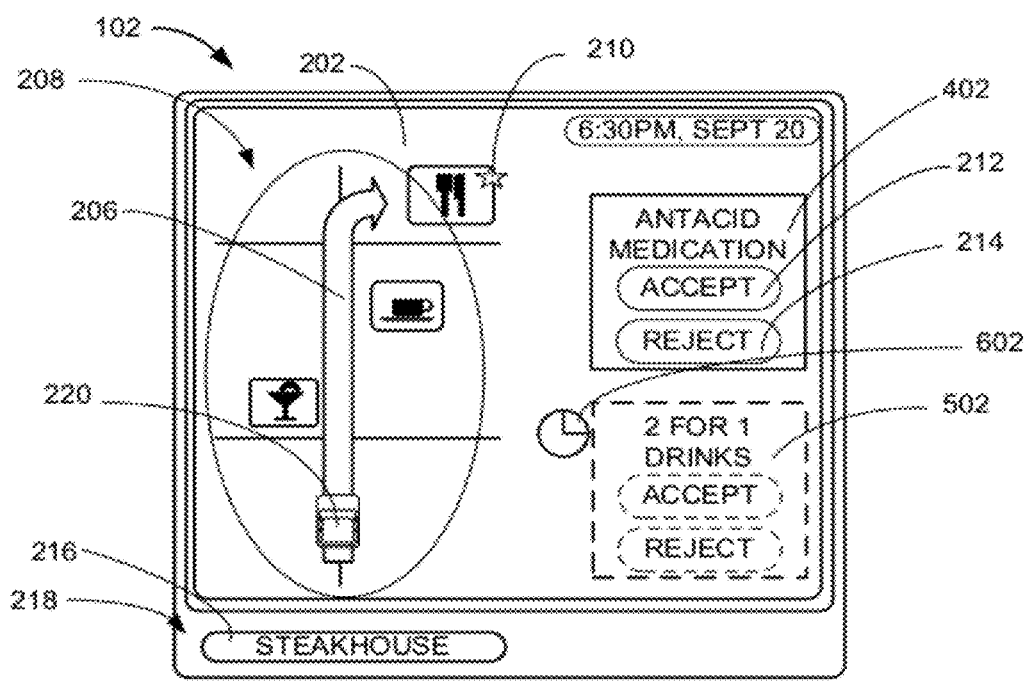
FIG. 6 shows a fifth example of the display interface of the first device.

Referring now to FIG. 6, therein is shown a fifth example of the display interface 202 of the first device 102. The fifth example also illustrates a situation when the user responds to the en-route notifications 204 by the non-response 502. More specifically, the navigation system 100 can detect the non-response 502 for the en-route notifications 204 based on meeting or exceeding of a time threshold 602.

The time threshold 602 is defined as a predefined time, time period, or a combination thereof to establish the inactivity by the user to the offering of the en-route notifications 204 as the non-response 502. As stated in the previous example, a sports bar along the route 206 can have a drink special. The display interface 202 can display one of the en-route notifications 204 as "2 for 1 drink special" to the vehicle prior to reaching the sports bar. The time threshold 602 can be three minutes.

If one of the en-route notifications 204 representing "2 for 1 drink special" had been displayed for three minutes or over three minutes and the user had not responded, the navigation system 100 can determine the inactivity by the user as the non-response 502, even if the vehicle had not reached the sports bar. For a different example, if one of the en-route notifications 204 representing "2 for 1 drink special" had been displayed for three minutes or over three minutes after the vehicle had passed the sports bar, the navigation system 100 can determine the inactivity by the user as the non-response 502.

The en-route notifications 204, which the navigation system 100 had detected the non-response 502 for meeting or exceeding the time threshold 602, can be displayed as dotted lines, no display at all, or a combination thereof. The navigation system 100 can update the en-route notifications 204 based on the non-response 502 by displaying the updated notification 402. The details regarding the generation of the updated notification 402 will be discussed later.

Referring now to FIG. 7, therein is shown an example of an acceptance trend 702. The acceptance trend 702 is defined as the pattern of the user accepting the en-route notifications 204 of FIG. 2 in a set time frame. The set time frame, for example, can represent a time of the day, days out of the week, a particular month out of the year, or a combination thereof. The pattern can represent the acceptance of the en-route notifications 204 in the past, the acceptance of the en-route notifications 204 in the future, or a combination thereof. For example, the user can accept the en-route notifications 204 representing the category of interest 216 for "wine" by selecting the notification acceptance 212 of FIG. 2 for four times around 3 PM over the past one week.

In this example, the left hand column can represent the type of the category of interest 216. For example, the left hand column denoted as "REST," "WINE," "MED," and "SALE" can represent restaurant, wine, medication, and bargain sales, respectively. The left hand column can be represented differently. For example, the left hand column can be represented by the destination 210 of FIG. 2.

The top row denoted as "12 PM," "3 PM," "7 PM," and "10 PM" can represent the time of the day. For a specific example, the user had selected the notification acceptance 212 for the category of interest 216 representing the medication around 3 PM for five times in the past one week. The top row can be represented differently. For example, the top row can be represented by days of the week.

Referring now to FIG. 8, therein is shown an example of a rejection trend 802. The rejection trend 802 is defined as the pattern of the user rejecting the en-route notifications 204 of FIG. 2 in a set time frame. The pattern can represent the rejection of the en-route notifications 204 in the past, the rejection of the en-route notifications 204 in the future, or a combination thereof. For example, the user can reject the en-route notifications 204 representing the category of interest 216 for "wine" by selecting the notification rejection 214 of FIG. 2 for twice around 3 PM over the past one week.

In this example, the left hand column can represent the type of the category of interest 216. For example, the left hand column denoted as "REST," "WINE," "MED," and "SALE" can represent restaurant, wine, medication, and bargain sales, respectively. The left hand column can be represented differently. For example, the left hand column can be represented by the destination 210 of FIG. 2.

The top row denoted as "12 PM," "3 PM," "7 PM," and "10 PM" can represent the time of the day. For a specific example, the user had selected the notification rejection 214 for the category of interest 216 representing the medication around 3 PM for once in the past one week. The top row can be represented differently. For example, the top row can be represented by days of the week.

Referring now to FIG. 9, therein is shown an example of a non-response trend 902. The non-response trend 902 is defined as the pattern of the user not responding to the en-route notifications 204 of FIG. 2 in a set time frame. The pattern can represent the non-response 502 of FIG. 5 of the en-route notifications 204 in the past, the non-response 502 of the en-route notifications 204 in the future, or a combination thereof. For example, the user can ignore the en-route notifications 204 representing the category of interest 216 for "wine" by not selecting the notification acceptance 212 of FIG. 2 for three times around 3 PM over the past one week.

In this example, the left hand column can represent the type of the category of interest 216. For example, the left hand column denoted as "REST," "WINE," "MED," and "SALE" can represent restaurant, wine, medication, and bargain sales respectively. The left hand column can be represented differently. For example, the left hand column can be represented by the destination 210 of FIG. 2.

The top row denoted as "12 PM," "3 PM," "7 PM," and "10 PM" can represent the time of the day. For a specific example, the user had the non-response 502 for the category of interest 216 representing the bargain sale around 12 PM for three times in the past one week. The top row can be represented differently. For example, the top row can be represented by days of the week.

Referring now to FIG. 10, therein is shown an example of a ranking 1002 of the category of interest 216. The ranking 1002 is defined as the ordinal order of the category of interest 216 based on the notification acceptance 212 of FIG. 2, the notification rejection 214 of FIG. 2, the non-response 502 of FIG. 5, or a combination thereof.

For this example, the ranking 1002 is for the category of interest 216 representing restaurant that the user had selected by selecting the notification acceptance 212. More specifically, the ranking 1002 ranks the Chinese restaurant as the most popular to the user and fast food restaurant as the least popular to the user.

Figure 11:
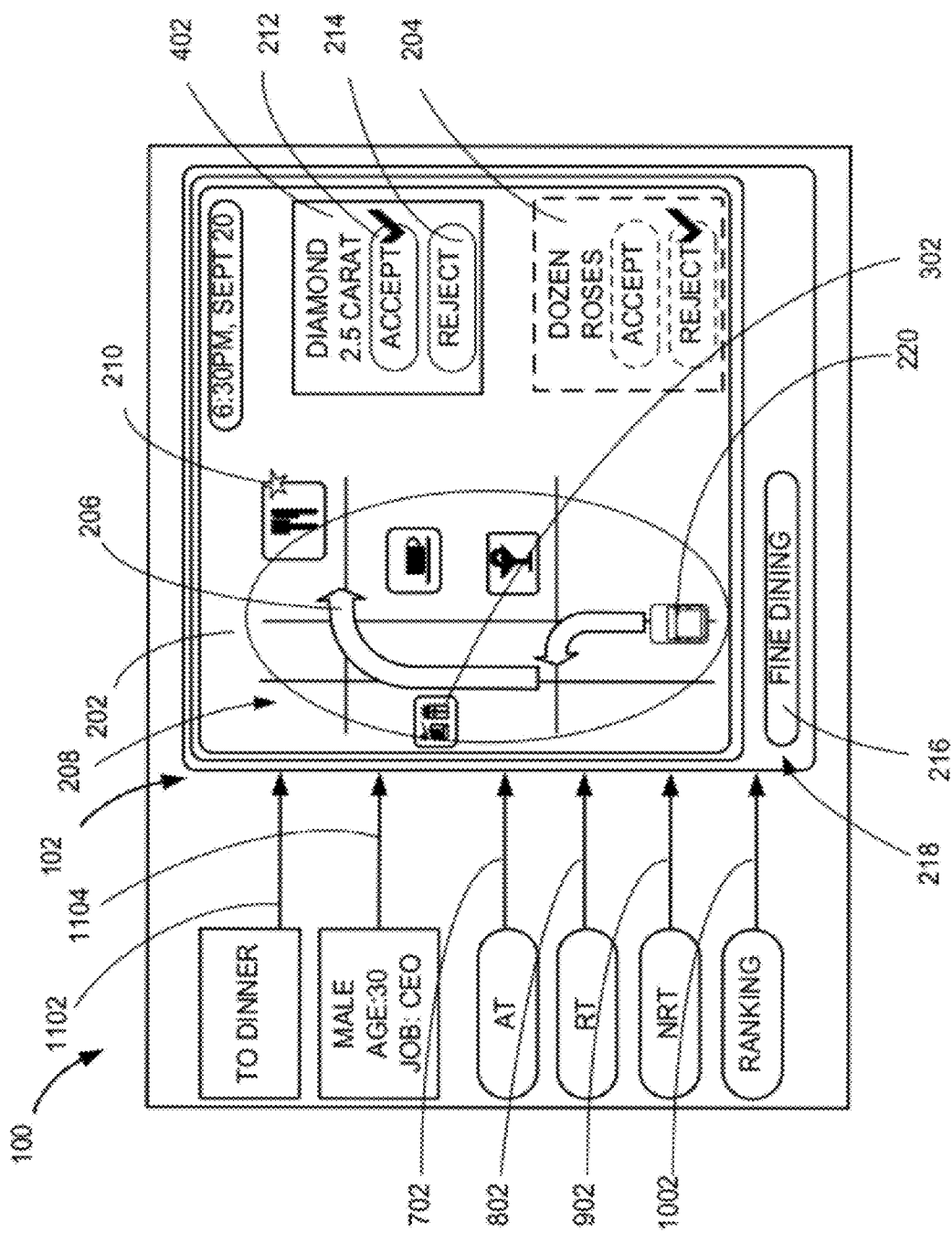
FIG. 11 shows an example of the navigation system delivering the en-route notifications.

Referring now to FIG. 11, therein is shown an example of the navigation system 100 delivering the en-route notifications 204. The navigation system 100 can deliver the en-route notifications 204 based on the notification acceptance 212, the notification rejection 214, the non-response 502 of FIG. 5, or a combination thereof. The navigation system 100 can deliver the en-route notifications 204 based on the acceptance trend 702, the rejection trend 802, the non-response trend 902, the ranking 1002, or a combination thereof. The navigation system 100 can also deliver the en-route notifications 204 based on the traveling context 208, a travel type 1102, a delivery profile 1104, or a combination thereof. The details regarding the navigation system 100 delivering the en-route notifications 204 will be discussed later.

The travel type 1102 is defined as a category of travel for traversing along the route 206 to reach the destination 210. For example, the destination 210 can be French Laundry™. Based on the destination 210, the travel type 1102 can be going out for fine dining. For a different example, the destination 210 can be Yosemite National Park in California. The travel type 1102 can be going on a camping trip to Yosemite National Park, which may include traveling along the route 206 that includes bumpy roads.

The navigation system 100 can recognize the traveling context 208 by identifying the travel type 1102. The details regarding the recognition of the traveling context 208 will be discussed later.

The delivery profile 1104 is defined as the collection of information for the navigation system 100 to base the generation of the en-route notifications 204. For example, the delivery profile 1104 can represent a collection of information of the user operating the navigation system 100. More specifically, the user can be a male, thirty years old, and a chief executive officer (CEO) at a startup company in the Silicon Valley, Calif.

For a more specific example, the user can make the entry 218 for the category of interest 216 representing "fine dining" Continuing with the previous example, the navigation system 100 can generate the route 206 to the destination 210 representing French Laundry™. The acceptance trend 702 as detailed in FIG. 7 can show that the user had selected the notification acceptance 212 for "bargain sales" six times around 7 PM in the past week. Additionally, the rejection trend 802 as detailed in FIG. 8 can show that the user had selected the notification rejection 214 for "medication" seven times around 7 PM in the past week. Furthermore, the non-response trend 902 as detailed in FIG. 9 can show that the user had the non-response for "wine" five times around 7 PM in the past week. Finally, the ranking 1002 for the category of interest 216 representing "gift for females" ranked "roses" as the highest ranking.

Continuing with the example, while the user's vehicle is traveling along the route 206, the navigation system 100 can deliver one of the en-route notifications 204 representing "dozen roses" based on the traveling context 208, the travel type 1102, and the delivery profile 1104. Furthermore, the navigation system 100 can deliver one of the en-route notifications 204 representing "dozen roses" based on the acceptance trend 702, the rejection trend 802, and the non-response trend 902.

As illustrated previously, based on the rejection trend 802, the navigation system 100 did not send the en-route notifications 204 representing the category of interest 216 for "medications" to the user. Additionally, as illustrated previously, based on the non-response trend 902, the navigation system 100 did not send the en-route notifications 204 representing the category of interest 216 for "wine" to the user. Finally, as illustrated previously, based on the ranking 1002, the navigation system 100 delivered one of the en-route notifications 204 representing "dozen roses" to the user.

Continuing with the example, the user can reject one of the en-route notifications 204 for "dozen roses" by selecting the notification rejection 214. Similarly, for generating the en-route notifications 204, the navigation system 100 can generate the updated notification 402 based on the traveling context 208, the travel type 1102, the delivery profile 1104, or a combination thereof.

Additionally, similarly for generating the en-route notifications 204, the navigation system 100 can generate the updated notification 402 based on the acceptance trend 702, the rejection trend 802, the non-response trend 902, the ranking 1002, or a combination thereof. Based on the above factors, the navigation system 100 can generate and deliver the updated notification 402 representing "diamond 2.5 carat" to the user. The details regarding the generation and the delivery of the updated notification 402 will be discussed later.

Continuing with the example, the user can accept the updated notification 402 for "diamond 2.5 carat" by selecting the notification acceptance 212. The navigation system 100 can update the route 206 to allow the user to stop by the intermediate stop 302 that sells the 2.5 carat diamond prior to reaching the destination 210.

Figure 12:
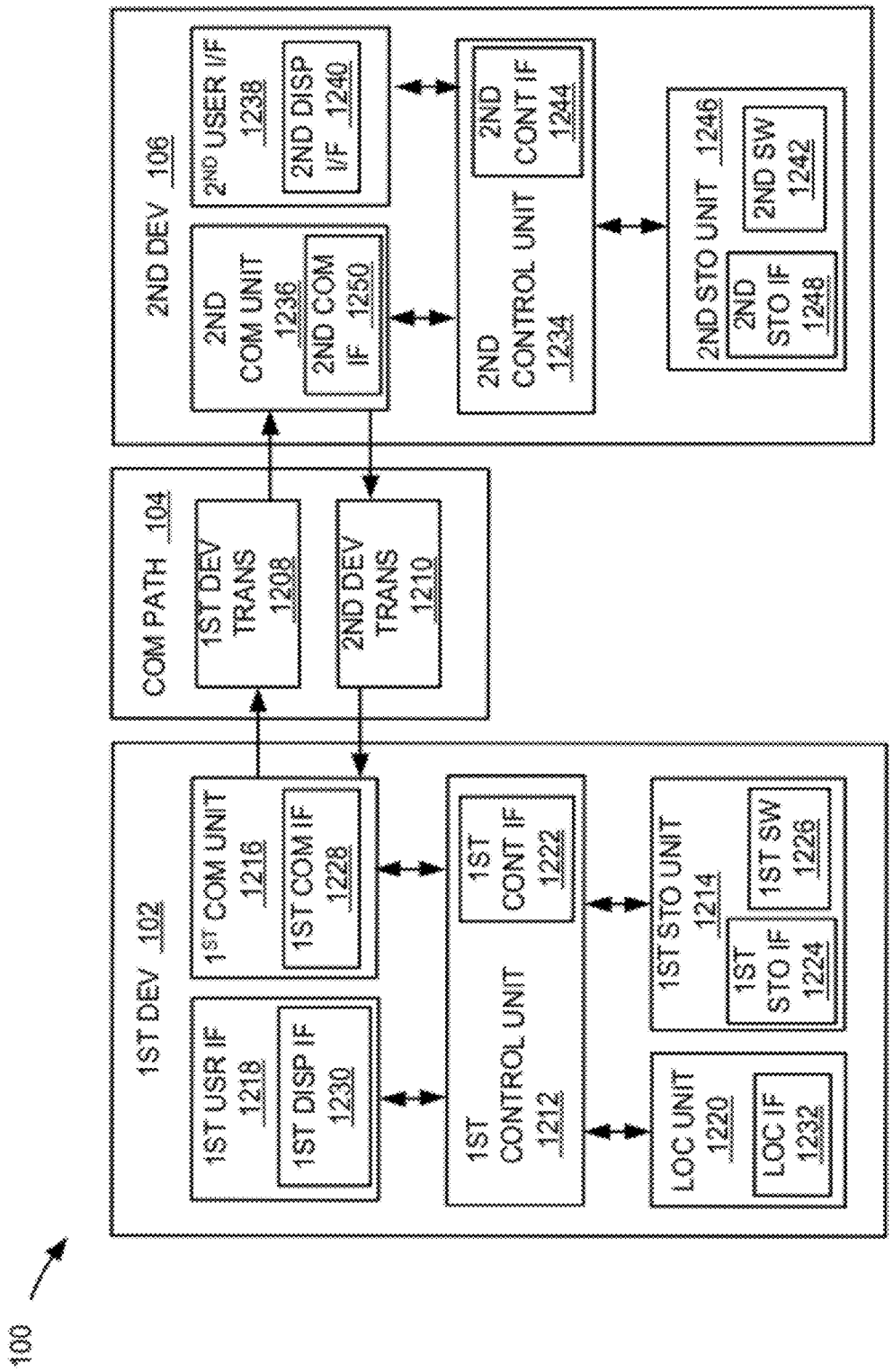
FIG. 12 shows an exemplary block diagram of the navigation system.

Referring now to FIG. 12, therein is shown an exemplary block diagram of the navigation system 100. The navigation system 100 can include the first device 102, the communication path 104, and the second device 106. The first device 102 can send information in a first device transmission 1208 over the communication path 104 to the second device 106. The second device 106 can send information in a second device transmission 1210 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 1212, a first storage unit 1214, a first communication unit 1216, a first user interface 1218, and a location unit 1220. The first device 102 can be similarly described by the first device 102.

The first control unit 1212 can include a first control interface 1222. The first control unit 1212 can execute a first software 1226 to provide the intelligence of the navigation system 100. The first control unit 1212 can be implemented in a number of different manners. For example, the first control unit 1212 can be a processor, an embedded processor, a microprocessor, a hardware control logic, a hardware finite state machine (FSM), a digital signal processor (DSP), or a combination thereof. The first control interface 1222 can be used for communication between the first control unit 1212 and other functional units in the first device 102. The first control interface 1222 can also be used for communication that is external to the first device 102.

The first control interface 1222 can receive information from the other functional units or from external sources, or can transmit information to the other functional units or to external destinations. The external sources and the external destinations refer to sources and destinations external to the first device 102.

The first control interface 1222 can be implemented in different ways and can include different implementations depending on which functional units or external units are being interfaced with the first control interface 1222. For example, the first control interface 1222 can be implemented with a pressure sensor, an inertial sensor, a microelectromechanical system (MEMS), optical circuitry, waveguides, wireless circuitry, wireline circuitry, or a combination thereof.

The location unit 1220 can generate location information, current heading, and current speed of the first device 102, as examples. The location unit 1220 can be implemented in many ways. For example, the location unit 1220 can function as at least a part of a global positioning system (GPS), an inertial navigation system, a cellular-tower location system, a pressure location system, or any combination thereof.

The location unit 1220 can include a location interface 1232. The location interface 1232 can be used for communication between the location unit 1220 and other functional units in the first device 102. The location interface 1232 can also be used for communication that is external to the first device 102.

The location interface 1232 can receive information from the other functional units or from external sources, or can transmit information to the other functional units or to external destinations. The external sources and the external destinations refer to sources and destinations external to the first device 102.

The location interface 1232 can include different implementations depending on which functional units or external units are being interfaced with the location unit 1220. The location interface 1232 can be implemented with technologies and techniques similar to the implementation of the first control interface 1222.

The first storage unit 1214 can store the first software 1226. The first storage unit 1214 can also store the relevant information, such as advertisements, points of interest (POI), navigation routing entries, or any combination thereof.

The first storage unit 1214 can be a volatile memory, a nonvolatile memory, an internal memory, an external memory, or a combination thereof. For example, the first storage unit 1214 can be a nonvolatile storage such as non-volatile random access memory (NVRAM), Flash memory, disk storage, or a volatile storage such as static random access memory (SRAM).

The first storage unit 1214 can include a first storage interface 1224. The first storage interface 1224 can be used for communication between the location unit 1220 and other functional units in the first device 102. The first storage interface 1224 can also be used for communication that is external to the first device 102.

The first storage interface 1224 can receive information from the other functional units or from external sources, or can transmit information to the other functional units or to external destinations. The external sources and the external destinations refer to sources and destinations external to the first device 102.

The first storage interface 1224 can include different implementations depending on which functional units or external units are being interfaced with the first storage unit 1214. The first storage interface 1224 can be implemented with technologies and techniques similar to the implementation of the first control interface 1222.

The first communication unit 1216 can enable external communication to and from the first device 102. For example, the first communication unit 1216 can permit the first device 102 to communicate with the second device 106 of FIG. 1, an attachment, such as a peripheral device or a computer desktop, and the communication path 104.

The first communication unit 1216 can also function as a communication hub allowing the first device 102 to function as part of the communication path 104 and not limited to be an end point or terminal unit to the communication path 104. The first communication unit 1216 can include active and passive components, such as microelectronics or an antenna, for interaction with the communication path 104.

The first communication unit 1216 can include a first communication interface 1228. The first communication interface 1228 can be used for communication between the first communication unit 1216 and other functional units in the first device 102. The first communication interface 1228 can receive information from the other functional units or can transmit information to the other functional units.

The first communication interface 1228 can include different implementations depending on which functional units are being interfaced with the first communication unit 1216. The first communication interface 1228 can be implemented with technologies and techniques similar to the implementation of the first control interface 1222.

The first user interface 1218 allows a user (not shown) to interface and interact with the first device 102. The first user interface 1218 can include an input device and an output device. Examples of the input device of the first user interface 1218 can include a keypad, a touchpad, soft-keys, a keyboard, a microphone, or any combination thereof to provide data and communication inputs.

The first user interface 1218 can include a first display interface 1230. The first display interface 1230 can include a display, a projector, a video screen, a speaker, or any combination thereof.

The first control unit 1212 can operate the first user interface 1218 to display information generated by the navigation system 100. The first control unit 1212 can also execute the first software 1226 for the other functions of the navigation system 100, including receiving location information from the location unit 1220. The first control unit 1212 can further execute the first software 1226 for interaction with the communication path 104 via the first communication unit 1216.

The second device 106 can be optimized for implementing the present invention in a multiple device embodiment with the first device 102. The second device 106 can provide the additional or higher performance processing power compared to the first device 102. The second device 106 can include a second control unit 1234, a second communication unit 1236, and a second user interface 1238.

The second user interface 1238 allows a user (not shown) to interface and interact with the second device 106. The second user interface 1238 can include an input device and an output device. Examples of the input device of the second user interface 1238 can include a keypad, a touchpad, soft-keys, a keyboard, a microphone, or any combination thereof to provide data and communication inputs. Examples of the output device of the second user interface 1238 can include a second display interface 1240. The second display interface 1240 can include a display, a projector, a video screen, a speaker, or any combination thereof.

The second control unit 1234 can execute a second software 1242 to provide the intelligence of the second device 106 of the navigation system 100. The second software 1242 can operate in conjunction with the first software 1226. The second control unit 1234 can provide additional performance compared to the first control unit 1212.

The second control unit 1234 can operate the second user interface 1238 to display information. The second control unit 1234 can also execute the second software 1242 for the other functions of the navigation system 100, including operating the second communication unit 1236 to communicate with the first device 102 over the communication path 104.

The second control unit 1234 can be implemented in a number of different manners. For example, the second control unit 1234 can be a processor, an embedded processor, a microprocessor, a hardware control logic, a hardware finite state machine (FSM), a digital signal processor (DSP), or a combination thereof.

The second control unit 1234 can include a second controller interface 1244. The second controller interface 1244 can be used for communication between the second control unit 1234 and other functional units in the second device 106. The second controller interface 1244 can also be used for communication that is external to the second device 106.

The second controller interface 1244 can receive information from the other functional units or from external sources, or can transmit information to the other functional units or to external destinations. The external sources and the external destinations refer to sources and destinations external to the second device 106.

The second controller interface 1244 can be implemented in different ways and can include different implementations depending on which functional units or external units are being interfaced with the second controller interface 1244. For example, the second controller interface 1244 can be implemented with a pressure sensor, an inertial sensor, a microelectromechanical system (MEMS), optical circuitry, waveguides, wireless circuitry, wireline circuitry, or a combination thereof.

A second storage unit 1246 can store the second software 1242. The second storage unit 1246 can also store the relevant information, such as advertisements, points of interest (POI), navigation routing entries, or any combination thereof. The second storage unit 1246 can be sized to provide the additional storage capacity to supplement the first storage unit 1214.

For illustrative purposes, the second storage unit 1246 is shown as a single element, although it is understood that the second storage unit 1246 can be a distribution of storage elements. Also for illustrative purposes, the navigation system 100 is shown with the second storage unit 1246 as a single hierarchy storage system, although it is understood that the navigation system 100 can have the second storage unit 1246 in a different configuration. For example, the second storage unit 1246 can be formed with different storage technologies forming a memory hierarchal system including different levels of caching, main memory, rotating media, or off-line storage.

The second storage unit 1246 can be a volatile memory, a nonvolatile memory, an internal memory, an external memory, or a combination thereof. For example, the second storage unit 1246 can be a nonvolatile storage such as nonvolatile random access memory (NVRAM), Flash memory, disk storage, or a volatile storage such as static random access memory (SRAM).

The second storage unit 1246 can include a second storage interface 1248. The second storage interface 1248 can be used for communication between the location unit 1220 and other functional units in the second device 106. The second storage interface 1248 can also be used for communication that is external to the second device 106.

The second storage interface 1248 can receive information from the other functional units or from external sources, or can transmit information to the other functional units or to external destinations. The external sources and the external destinations refer to sources and destinations external to the second device 106.

The second storage interface 1248 can include different implementations depending on which functional units or external units are being interfaced with the second storage unit 1246. The second storage interface 1248 can be implemented with technologies and techniques similar to the implementation of the second controller interface 1244.

The second communication unit 1236 can enable external communication to and from the second device 106. For example, the second communication unit 1236 can permit the second device 106 to communicate with the first device 102 over the communication path 104.

The second communication unit 1236 can also function as a communication hub allowing the second device 106 to function as part of the communication path 104 and not limited to be an end point or terminal unit to the communication path 104. The second communication unit 1236 can include active and passive components, such as microelectronics or an antenna, for interaction with the communication path 104.

The second communication unit 1236 can include a second communication interface 1250. The second communication interface 1250 can be used for communication between the second communication unit 1236 and other functional units in the second device 106. The second communication interface 1250 can receive information from the other functional units or can transmit information to the other functional units.

The second communication interface 1250 can include different implementations depending on which functional units are being interfaced with the second communication unit 1236. The second communication interface 1250 can be implemented with technologies and techniques similar to the implementation of the second controller interface 1244.

The first communication unit 1216 can couple with the communication path 104 to send information to the second device 106 in the first device transmission 1208. The second device 106 can receive information in the second communication unit 1236 from the first device transmission 1208 of the communication path 104.

The second communication unit 1236 can couple with the communication path 104 to send information to the first device 102 in the second device transmission 1210. The first device 102 can receive information in the first communication unit 1216 from the second device transmission 1210 of the communication path 104. The navigation system 100 can be executed by the first control unit 1212, the second control unit 1234, or a combination thereof.

For illustrative purposes, the second device 106 is shown with the partition having the second user interface 1238, the second storage unit 1246, the second control unit 1234, and the second communication unit 1236, although it is understood that the second device 106 can have a different partition. For example, the second software 1242 can be partitioned differently such that some or all of its function can be in the second control unit 1234 and the second communication unit 1236. Also, the second device 106 can include other functional units not shown in FIG. 12 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 1220, although it is understood that the second device 106 can also operate the location unit 1220.

Figure 13:
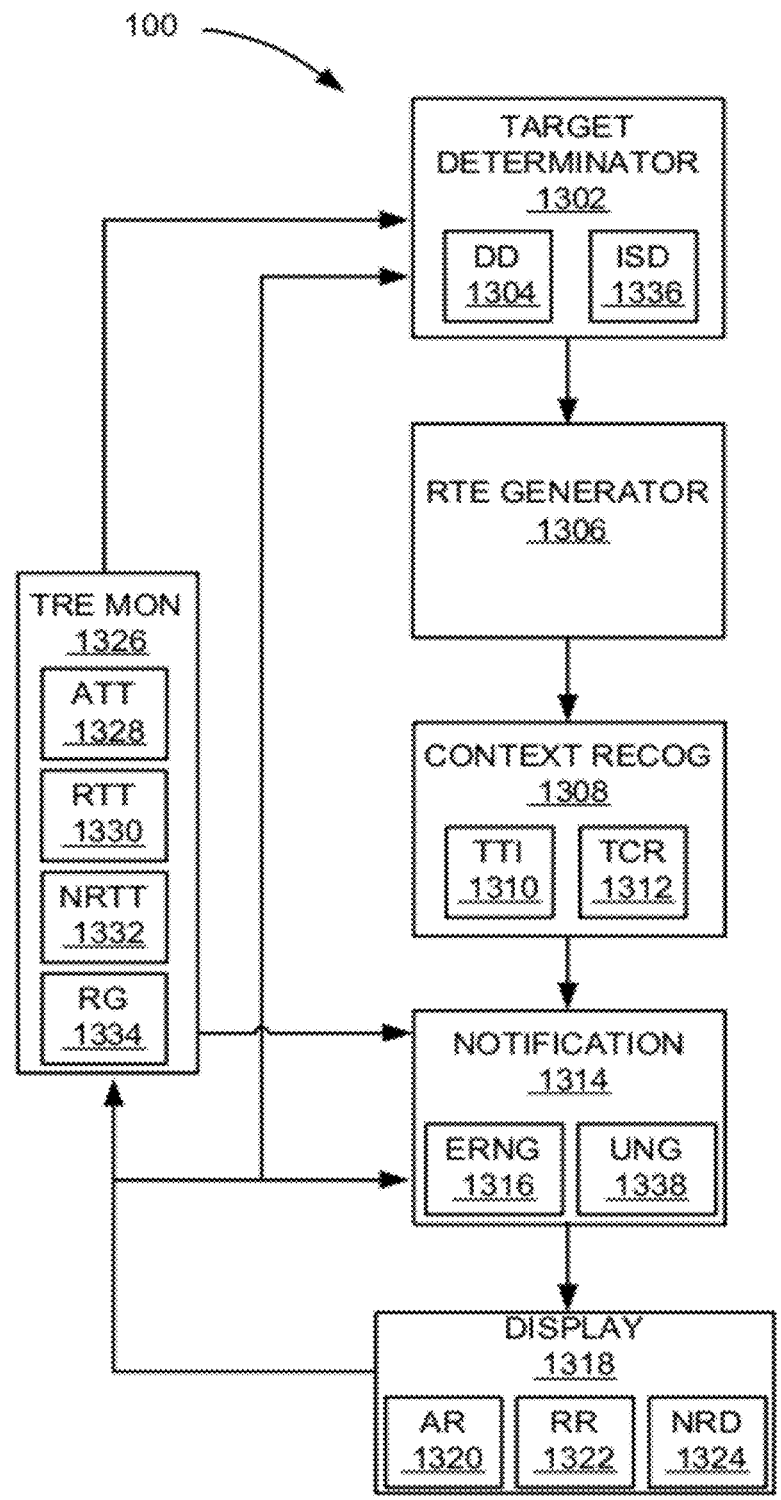
FIG. 13 shows a control flow of the navigation system with destination-centric en-route notification delivery mechanism.

Referring now to FIG. 13, therein is shown a control flow of the navigation system 100 with destination-centric en-route notification delivery mechanism. The navigation system 100 can include a target determinator module 1302. The target determinator module 1302 identifies the type of geographic location where the user's vehicle is traveling to for the target destination. For example, the target determinator module 1302 can identify the category of interest 216 of FIG. 2 for the destination 210 of FIG. 2.

The target determinator module 1302 can identify the category of interest 216 in a number of ways. The target determinator module 1302 includes a destination determinator module 1304. The destination determinator module 1304 identifies the type of target destination where the user's vehicle desires to reach. More specifically, the destination determinator module 1304 can identify the category of interest 216 for the destination 210.

The destination determinator module 1304 can identify the category of interest 216 by receiving the entry 218 of FIG. 2 for the destination 210. For example, the destination determinator module 1304 can include a map that includes detailed information for various points of interest, such as lists of coffee shops, car dealers, and dry cleaners. The user, the navigation system 100, or a combination thereof can make the entry 218 for the various points of interest. For a further example, the entry 218 can be French Laundry™. The map can contain information that French Laundry™ is a restaurant. The destination determinator module 1304 can identify the category of interest 216 for the destination 210 representing French Laundry™ to be a restaurant.

As a different example, the destination determinator module 1304 can identify the category of interest 216 by accessing external sources, such as a restaurant rating services (Michelin™, Zagat™ or Yelp.com™), through the first control interface 1222 of FIG. 12. For example, the destination determinator module 1304 can access Yelp.com™ to identify that French Laundry™ is categorized under "restaurant" for Yelp.com™.

For illustrative purposes, the navigation system 100 is described with the destination determinator module 1304 identifying the category of interest 216 for the destination 210, although it is understood that the navigation system 100 can operate the destination determinator module 1304 differently. For example, the destination determinator module 1304 can identify the destination 210 for the category of interest 216.

The destination determinator module 1304 can identify the destination 210 in a number of ways. For example, the destination determinator module 1304 can include a repository that contains a list of points of interest categorized by the category of interest 216. For a further example, the destination determinator module 1304 can receive the entry 218 for the category of interest 216. More specifically, if the user selects "restaurant" for the category of interest 216, the destination determinator module 1304 can generate a list of restaurants, for example, within the five mile radius.

The destination determinator module 1304 can narrow the list of restaurants based on the acceptance trend 702 of FIG. 7, the rejection trend 802 of FIG. 8, the non-response trend 902 of FIG. 9, the ranking 1002 of FIG. 10, the travel type 1102 of FIG. 11, the delivery profile 1104 of FIG. 11, the time of day, or a combination thereof. For example, the destination determinator module 1304 can store information for the travel type 1102, the delivery profile 1104, the ranking 1002, or a combination thereof.

For a specific example, the delivery profile 1104 can indicate that the user takes his wife out for dinner every Thursday evening. Furthermore, the travel type 1102 can be going out for a steak dinner. The ranking 1002 can show the prime rib as the top choice for type of steaks. The acceptance trend 702 can indicate that the user has accepted the en-route notifications 204 of FIG. 2 for wines on Thursday evenings. Based on matching the delivery profile 1104, the travel type 1102, the ranking 1002, and the acceptance trend 702, the destination determinator module 1304 can identify the destination 210 to be a steakhouse called Lawry's™.

The target determinator module 1302 includes an intermediate stop determinator module 1336. Details regarding the intermediate stop determinator module 1336 will be discussed later.

The navigation system 100 can include a route generator module 1306. The route generator module 1306 generates a path to where the user desires to reach. For example, the route generator module 1306 can generate the route 206 to the destination 210 from the current location 220 of FIG. 2.

The navigation system 100 can include a context recognition module 1308. The context recognition module 1308 recognizes the facts, interests, circumstances, or a combination thereof that exists while user's vehicle travels along the path to reach the desired point of interest. For example, the context recognition module 1308 can recognize the traveling context 208 of FIG. 2 for traveling along the route 206 to the destination 210.

The context recognition module 1308 can recognize the traveling context 208 in a number of ways. The context recognition module 1308 includes a travel type identifier module 1310. The travel type identifier module 1310 identifies the category of travel for traveling along the path. For example, the travel type identifier module 1310 can identify the travel type 1102 based on the route 206.

For a specific example, the route 206 can guide the user's vehicle to reach the destination 210 representing French Laundry™. The calendar stored in the travel type identifier module 1310 can indicate that the date is user's fiancée's birthday. Based on matching the set of facts representing the route 206 and the date, the travel type identifier module 1310 can identify that going out to celebrate the fiancée's birthday by dining at the French Laundry™ can represent the travel type 1102 for traveling along the route 206.

The context recognition module 1308 can include a traveling context recognizer module 1312. The traveling context recognizer module 1312 recognizes the facts, interests, circumstances, or a combination thereof that exists while user's vehicle travels along the path to reach the desired point of interest. The traveling context recognizer module 1312 can recognize the traveling context 208 based on the travel type 1102 for traveling along the route 206 to the destination 210.

The traveling context recognizer module 1312 can recognize the traveling context 208 in a number of ways. For example, the category of interest 216 for the destination 210 can indicate the type of occasion for traversing the route 206. More specifically, French Laundry™ can represent the destination 210. The category of interest 216 for the destination 210 can indicate fine dining at a three Michelin™ starred restaurant.

Furthermore, the calendar can indicate that the date for the reservation at French Laundry™ can be on the user's fiancée's birthday. Based on matching the travel type 1102, the destination 210, the category of interest 216, the date, or a combination thereof, the traveling context recognizer module 1312 can recognize the traveling context 208 to be a trip to attend a special dinner occasion for the user and user's fiancée.

The navigation system 100 can include a notification module 1314. The notification module 1314 generates the notification that is relevant to the user's profile and the type of point of interest where the user intends to reach while the user is traveling along the path to reach that desired point of interest. For example, the notification module 1314 can generate the en-route notifications 204 based on matching the delivery profile 1104 to the category of interest 216 for traveling within the traveling context 208 for displaying on the first device 102 of FIG. 1. For another example, the notification module 1314 can generate the en-route notifications 204 based on the category of interest 216 for reflecting the travel type 1102 related to the destination 210. For a different example, the notification module 1314 can generate the en-route notifications 204 based on the ranking 1002 for meeting the travel type 1102.

The notification module 1314 can generate the en-route notifications 204 in a number of ways. The notification module 1314 includes an en-route notification generator module 1316. The en-route notification generator module 1316 generates the en-route notifications 204.

The en-route notification generator module 1316 can generate the en-route notifications 204 in a number of ways. The en-route notification generator module 1316 can store a variety of the en-route notifications 204. More specifically, the en-route notifications 204 can be preinstalled into the en-route notification generator module 1316 from a Compact Disc (CD) or Digital Versatile Disc (DVD) with the en-route notifications 204.

As a different example, the en-route notification generator module 1316 can obtain the en-route notifications 204 from external sources, such as Yelp.com™, through the first control interface 1222. The en-route notification generator module 1316 can store the en-route notifications 204 for different types of the category of interest 216, such as restaurants, bargain sales, or medical emergencies.

For a specific example, the destination 210 can be French Laundry™. As described previously, the category of interest 216 can be fine dining and the traveling context 208 can be on the way for a special dinner occasion. The travel type 1102 can be going out for dinner. The en-route notification generator module 1316 can generate one of the en-route notifications 204 representing a visual message for "dozen roses" by matching the delivery profile 1104 to the category of interest 216 while traveling within the traveling context 208 to entice the user to stop by to purchase a dozen roses as a birthday gift for his fiancée at French Laundry™.

For a different example, the travel type 1102 can be going out to celebrate the user's fiancée's birthday at French Laundry™. The ranking 1002 can indicate that French Laundry™ was on the top of the list for restaurant that both the user and his fiancée wanted to dine most. The notification module 1314 can generate one of the en-route notifications 204 representing "Silver Oaks™ Cabernet Sauvignon" based on the ranking 1002 for meeting the travel type 1102 to entice the user to purchase a bottle of nice Cabernet Sauvignon for dinner before the user reaches the destination 210.

The navigation system 100 can include a display module 1318. The display module 1318 displays the visual notifications. For example, the display module 1318 can display the visual version of the en-route notifications 204, play the audio version of the en-route notifications 204, or a combination thereof.

For illustrative purposes, the navigation system 100 is described with the display module 1318 displaying the en-route notifications 204, although it is understood that the navigation system 100 can operate the display module 1318 differently. For example, the display module 1318 can receive the notification acceptance 212 of FIG. 2, the notification rejection 214 of FIG. 2, or a combination thereof for the en-route notifications 204.

The display module 1318 can receive the notification acceptance 212 and the notification rejection 214 in a number of ways. The display module 1318 includes an acceptance receiver module 1320 and a rejection receiver module 1322. The acceptance receiver module 1320 receives the notification acceptance 212 and the rejection receiver module 1322 receives the notification rejection 214.

For a specific example, when the display module 1318 displays one of the en-route notifications 204 representing "dozen roses," the acceptance receiver module 1320 can receive the notification acceptance 212 from the user when the user selects the functionality on the display module 1318 for the notification acceptance 212, gives oral command that indicates the notification acceptance 212, such as "ACCEPT," or a combination thereof. The rejection receiver module 1322 can also receive the notification rejection 214 similar to the acceptance receiver module 1320 receiving the notification acceptance 212.

For illustrative purposes, the navigation system 100 is described with the display module 1318 receiving the notification acceptance 212 and the notification rejection 214, although it is understood that the navigation system 100 can operate the display module 1318 differently. For example, the display module 1318 can detect the non-response 502 of FIG. 5 for the en-route notifications 204.

The display module 1318 can detect the non-response 502 in a number of ways. The display module 1318 includes a non-response detector module 1324. The non-response detector module 1324 can detect the non-response 502 for the en-route notifications 204 based on meeting or exceeding the time threshold 602 of FIG. 6, the occurrence 504 of FIG. 5 of the event 506 of FIG. 5, or a combination thereof.

For a specific example, as described in FIG. 5, the non-response detector module 1324 can detect the non-response 502 for the en-route notifications 204 based on the occurrence 504 of the event 506. One of the en-route notifications 204 can represent "2 for 1 drink special" at a sports bar. The occurrence 504 of the event 506, as described in FIG. 5, can be the user's vehicle passing the sports bar without accepting or rejecting the en-route notifications 204.

The non-response detector module 1324 can identify one of the en-route notifications 204 representing the "2 for 1 drink special" belongs to the sports bar, because the notification module 1314 can store that unique version of the en-route notifications 204 for the sports bar. The non-response detector module 1324 can identify the current location 220 of the user's vehicle in relation to the geographic location of the sports bar through the location unit 1220 of FIG. 12. Once the non-response detector module 1324 detects the distance between the current location 220 of the vehicle in relation to the sports bar has reached a predefined distance of, for example, 500 yards radius, the non-response detector module 1324 can detect the en-route notifications 204 to be the non-response 502.

For a different example, as described in FIG. 6, the non-response detector module 1324 can detect the non-response for the en-route notifications 204 based on meeting or exceeding the time threshold 602. Continuing with the previous example, the en-route notifications 204 can represent a "2 for 1 drink special" at a sports bar. The non-response detector module 1324 can include a clock to track time.

When the en-route notifications 204 representing a "2 for 1 drink special" is displayed by the display module 1318, the non-response detector module 1324 can start tracking time for the duration of that the en-route notifications 204 are being displayed. Additionally, the non-response detector module 1324 can have the time threshold 602 predefined as three minutes. If the acceptance receiver module 1320 has not received the notification acceptance 212 or the rejection receiver module 1322 has not received the notification rejection 214 after three minutes or more, the non-response detector module 1324 can detect the non-response 502 for the en-route notifications 204 has met or exceeded the time threshold 602 of three minutes.

The navigation system 100 can include a trend monitor module 1326. The trend monitor module 1326 manages the trend for user's response to the notifications delivered by the navigation system 100. For example, the trend monitor module 1326 can extrapolate the acceptance trend 702, the rejection trend 802, the non-response trend 902, or a combination thereof.

The trend monitor module 1326 can extrapolate in a number of ways. For example, the trend monitor module 1326 includes an acceptance trend tracker module 1328. The acceptance trend tracker module 1328 extrapolates the acceptance trend 702 based on the notification acceptance 212.

For example, the acceptance trend tracker module 1328 can extrapolate the acceptance trend 702 as described in FIG. 7. More specifically, the acceptance trend tracker module 1328 can track the acceptance trend 702 for each reception of the notification acceptance 212 for the category of interest 216. For a further example, as described in FIG. 7, the acceptance receiver module 1320 can receive the notification acceptance 212 for the en-route notifications 204 representing the category of interest 216 for "wine: four times at 3 PM in the past week. The acceptance trend tracker module 1328 can track the acceptance trend 702 for each of the category of interest 216 for, for example, every week. Based on the acceptance trend 702 for the category of interest 216 for each week, the acceptance trend tracker module 1328 can extrapolate that the user will likely select the notification acceptance 212 for the en-route notifications 204 representing "wine" around 3 PM for next month.

The trend monitor module 1326 includes a rejection trend tracker module 1330 and a non-response trend tracker module 1332. The rejection trend tracker module 1330 extrapolates the rejection trend 802 based on the notification rejection 214 similarly to as the acceptance trend tracker module 1328 can extrapolate the acceptance trend 702. The non-response trend tracker module 1332 extrapolates the non-response trend 902 based on the non-response 502 similarly to as the acceptance trend tracker module 1328 can extrapolate the acceptance trend 702.

For illustrative purposes, the navigation system 100 is described with the trend monitor module 1326 extrapolating the acceptance trend 702, the rejection trend 802, the non-response trend 902, or a combination thereof, although it is understood that the navigation system 100 can operate the trend monitor module 1326 differently. For example, the trend monitor module 1326 can generate the ranking 1002 for the en-route notifications 204.

The trend monitor module 1326 can generate the ranking 1002 in a number of ways. For example, the trend monitor module 1326 includes a ranking generator module 1334. The ranking generator module 1334 generates the ranking 1002 based on the notification acceptance 212 for the en-route notifications 204. More specifically, the ranking 1002 can be for the category of interest 216 representing restaurants. The ranking generator module 1334 can track the notification acceptance 212 for the category of interest 216.

As shown in FIG. 10, the ranking 1002 illustrates the order for the most number of the notification acceptance 212 for the particular type of the category of interest 216 representing restaurants. The illustration highlights that the ranking generator module 1334 had received the most number of the notification acceptance 212 for the category of interest 216 representing Chinese restaurants. The ranking generator module 1334 can also generate the ranking 1002 based on the notification rejection 214, the non-response 502, or a combination thereof for the en-route notifications 204 similarly to as the ranking generator module 1334 can generate the ranking 1002 based on the notification acceptance 212.

For illustrative purposes, the navigation system 100 is described with the target determinator module 1302 identifying the destination 210, although it is understood that the navigation system 100 can operate the target determinator module 1302 differently. For example, the target determinator module 1302 can identify the intermediate stop 302 of FIG. 3.

The target determinator module 1302 can identify the intermediate stop 302 in a number of ways. As discussed earlier, the target determinator module 1302 includes the intermediate stop determinator module 1336. The intermediate stop determinator module 1336 identifies the intermediate stop 302 for the notification acceptance 212 prior to reaching the destination 210.

As previously discussed, the en-route notification generator module 1316 can store the en-route notifications 204 for different types of the category of interest 216. Furthermore, the en-route notification generator module 1316 can store detailed information, such as the physical address and contact information, for the source of the en-route notifications 204.

When the acceptance receiver module 1320 received the notification acceptance 212, the intermediate stop determinator module 1336 can receive the detailed information for the en-route notifications 204. Based on the detailed information, the intermediate stop determinator module 1336 can identify the intermediate stop 302 by determining whether the user had selected the notification acceptance 212 or not.

For a different example, the intermediate stop determinator module 1336 can identify the intermediate stop 302 by obtaining the detailed information from external sources, such as Yelp.com™, through the first control interface 1222. More specifically, the en-route notifications 204 can include keywords of name of the source for the notification. The intermediate stop determinator module 1336 can query the keywords or name through a wireless connection via the first control interface 1222 to access external sources, such as Yelp.com™. By accessing the external sources, the intermediate stop determinator module 1336 can identify the intermediate stop 302 for the en-route notifications 204.

For illustrative purposes, the navigation system 100 is described with the route generator module 1306 generating the route 206, although it is understood that the navigation system 100 can operate the route generator module 1306 differently. For example, the route generator module 1306 can update the route 206 for reaching the intermediate stop 302 based on the notification acceptance 212 for displaying on the device 102. More specifically, the route generator module 1306 can update the route 206 by generating the route 206 from the current location 220 where the user had selected the notification acceptance 212 to the intermediate stop 302 for the en-route notifications 204.

For illustrative purposes, the navigation system 100 is described with the traveling context recognizer module 1312 recognizing the traveling context 208, although it is understood that the navigation system 100 can operate the traveling context recognizer module 1312 differently. For example, the traveling context recognizer module 1312 can update the traveling context 208 based on updating the route 206.

More specifically, when the route 206 is updated to stop by the intermediate stop 302, the traveling context 208 for traveling the route 206 to reach the intermediate stop 302 can change. When the destination 210 is French Laundry™, the traveling context 208 can be traversing the route 206 to attend a special dinner occasion. If the intermediate stop 302 can be CVS Pharmacy™, the traveling context 208 can be traversing the route 206 to receive immediate medical attention or making a potty stop.

When the traveling context 208 changes, the content of the en-route notifications 204 can change to tailor to the updated circumstance of the traveling context 208. The traveling context recognizer module 1312 can update the traveling context 208 based on similar factors as to the traveling context recognizer module 1312 recognizing the traveling context 208. The details regarding the tailoring of the en-route notifications 204 will be discussed later.

For illustrative purposes, the navigation system 100 is described with the notification module 1314 generating the en-route notifications 204, although it is understood that the navigation system 100 can operate the notification module 1314 differently. For example, the notification module 1314 can generate the updated notification 402 of FIG. 4.

The notification module 1314 can generate the updated notification 402 in a number of ways. For example, the notification module 1314 includes an updated notification generator module 1338. The updated notification generator module 1338 generates the updated notification 402 based on the notification acceptance 212, the notification rejection 214, the non-response 502, or a combination thereof for reflecting the travel type 1102 related to the destination 210.

For example, the acceptance receiver module 1320 can receive the notification acceptance 212 for the en-route notifications 204 representing "Silver Oaks™ Cabernet Sauvignon" as previously discussed. Based on the notification acceptance 212, the updated notification generator module 1338 can generate the updated notification 402 representing "Cheese" to entice the user to purchase cheese for the wine.

The generation of the updated notification 402 is similar to the generation of the en-route notifications 204 as previously discussed. The generation of the updated notification 402 based on the notification rejection 214, the non-response 502, or a combination thereof can be similar to as the generation of the updated notification 402 based on the notification acceptance 212 as previously discussed.

For a different example, the updated notification generator module 1338 can generate the updated notification 402 based on the acceptance trend 702, the rejection trend 802, the non-response trend 902, or a combination thereof for the en-route notifications 204. In contrast, for a specific example, the trend monitor module 1326 can also manage the acceptance trend 702, the rejection trend 802, and the non-response trend 902 for the updated notification 402 similarly to as for the management for the en-route notifications 204.

More specifically, the rejection trend 802 illustrated in FIG. 8 can indicate that the rejection receiver module 1322 received the notification rejection 214 for the en-route notifications 204 for medication seven times around 7 PM the past week. Based on the rejection trend 802, the updated notification generator module 1338 can avoid generating the updated notification 402 representing medication around 7 PM. The generation of the updated notification 402 based on the acceptance trend 702, the non-response trend 902, or a combination thereof can be similar to as the generation of the updated notification 402 based on the rejection trend 802 as previously discussed.

For another example, the updated notification generator module 1338 can generate the updated notification 402 based on the intermediate stop 302 for traversing the route 206 for reaching the intermediate stop 302. As previously discussed for tailoring the notification based on the updating of the route 206, the updated notification 402 can be generated to match the travel type 1102 while traversing the route 206 for reaching the intermediate stop 302. The generation of the updated notification 402 can be based on the delivery profile 1104, the category of interest 216 for reflecting the travel type 1102 related to the intermediate stop 302 similarly to as the generation of the en-route notifications 204 as previously discussed.

For a different example, the updated notification 402 can be generated based on the traveling context 208 for reflecting the travel type 1102 related to the intermediate stop 302. If the traveling context 208 can be traveling to the nearest pharmacy for the intermediate stop 302 to pick up a medication, the updated notification generator module 1338 can generate the updated notification 402 representing grocery stop to allow the user stop by another location for the intermediate stop 302 to purchase water to take the medication.

The physical transformation from displaying the en-route notifications 204 result in movement in the physical world, such as people using the first device of FIG. 1, the vehicle, or a combination thereof, based on the operation of the navigation system 100. As the movement in the physical world occurs, the movement itself creates additional information that is converted back to the updated notification 402 for the continued operation of the navigation system 100 and to continue the movement in the physical world.

The first software 1226 of FIG. 12 of the first device 102 of FIG. 12 can include the navigation system 100. For example, the first software 1226 can include the target determinator module 1302, the route generator module 1306, the context recognition module 1308, the notification module 1314, the display module 1318, and the trend monitor module 1326. The first user interface 1218 of FIG. 12 can accept the selection for the entry 218, the notification acceptance 212, the notification rejection 214, or a combination thereof.

The first control unit 1212 of FIG. 12 can execute the first software 1226 for the target determinator module 1302 to receive the entry 218 and identify the destination 210, the intermediate stop 302, or a combination thereof. The first control unit 1212 can execute the first software 1226 for the route generator module 1306 to generate the route 206 from the current location 220 to the destination 210, the intermediate stop 302, or a combination thereof.

The first control unit 1212 can execute the first software 1226 for the context recognition module 1308 to recognize the traveling context 208. The first control unit 1212 can execute the first software 1226 for the notification module 1314 to generate the en-route notifications 204, the updated notification 402, or a combination thereof.

The display module 1318 can represent the first display interface 1230 of FIG. 12. The first control unit 1212 can execute the first display interface 1230 for receiving the notification acceptance 212, the notification rejection 214, or a combination thereof.

The first control unit 1212 can execute the first software 1226 for the trend monitor module 1326 for extrapolating the acceptance trend 702, the rejection trend 802, the non-response trend 902, or a combination thereof. The first control unit 1212 can execute the first software 1226 for the trend monitor module 1326 for generating the ranking 1002.

The second software 1242 of FIG. 12 of the second device 106 of FIG. 12 can include the navigation system 100. For example, the second software 1242 can include the target determinator module 1302, the route generator module 1306, the context recognition module 1308, the notification module 1314, the display module 1318, and the trend monitor module 1326. The second user interface 1238 of FIG. 12 can accept the selection for the entry 218, the notification acceptance 212, the notification rejection 214, or a combination thereof.

The second control unit 1234 of FIG. 12 can execute the second software 1242 for the target determinator module 1302 to receive the entry 218 and identify the destination 210, the intermediate stop 302, or a combination thereof. The second control unit 1234 can execute the second software 1242 for the route generator module 1306 to generate the route 206 from the current location 220 to the destination 210, the intermediate stop 302, or a combination thereof.

The second control unit 1234 can execute the second software 1242 for the context recognition module 1308 to recognize the traveling context 208. The second control unit 1234 can execute the second software 1242 for the notification module 1314 to generate the en-route notifications 204, the updated notification 402, or a combination thereof.

The display module 1318 can represent the second display interface 1240 of FIG. 12. The second control unit 1234 can execute the second display interface 1240 for receiving the notification acceptance 212, the notification rejection 214, or a combination thereof.

The second control unit 1234 can execute the second software 1242 for the trend monitor module 1326 for extrapolating the acceptance trend 702, the rejection trend 802, the non-response trend 902, or a combination thereof. The second control unit 1234 can execute the second software 1242 for the trend monitor module 1326 for generating the ranking 1002.

The navigation system 100 can be partitioned between the first software 1226 and the second software 1242. For example, the second software 1242 can include the target determinator module 1302, the route generator module 1306, the context recognition module 1308, the notification module 1314, and the trend monitor module 1326. The second control unit 1234 can execute modules partitioned on the second software 1242 as previously described.

The first software 1226 can include the display module 1318. Based on the size of the first storage unit 1214 of FIG. 12, the first software 1226 can include additional modules of the navigation system 100. The first control unit 1212 can execute the modules partitioned on the first software 1226 as previously described.

The entry 218 can be entered into the first user interface 1218. The first control unit 1212 can operate the first communication unit 1216 of FIG. 12 to send the entry 218 to the second device 106. The first control unit 1212 can operate the first software 1226 to operate the location unit 1220 of FIG. 12.

The second communication unit 1236 of FIG. 12 can send the route 206, the en-route notifications 204, the updated notification 402, or a combination thereof to the first device 102 through the communication path 104 of FIG. 12. The route 206, the en-route notifications 204, the updated notification 402, or a combination thereof can be displayed on the first display interface 1230 and the second device 106. The display module 1318 can send the notification acceptance 212, the notification rejection 214, the non-response 502, or a combination thereof to the second device 106 through the communication path 104.

It has been discovered that the present invention provides the navigation system 100 for providing safe operation of the navigation system 100 and other user interface system within a vehicle. The safe operation is provided by recognizing the traveling context 208 based on the navigation system 100 receiving the entry 218 and identifying the category of interest 216 for the destination 210 to aid the user for operating the vehicle to travel along the route 206 safely. Furthermore, generating the en-route notifications 204, the updated notification 402, or a combination thereof that reflects the travel type 1102 can aid the user for operating the vehicle by presenting information sought after by the user and reducing distractions that can inhibit a safe travel along the route 206.

The navigation system 100 describes the module functions or order as an example. The modules can be partitioned differently. For example, the route generator module 1306 and the context recognition module 1308 can be combined. Each of the modules can operate individually and independently of the other modules.

Figure 14:
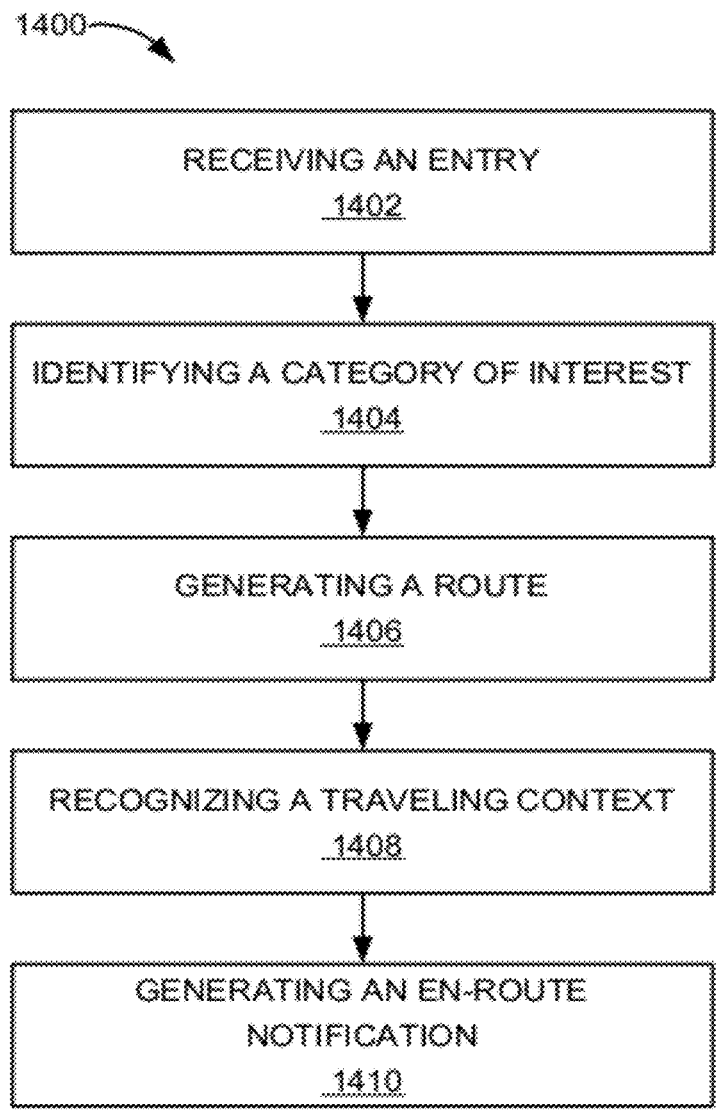
FIG. 14 shows a flow chart of a method of operation of the navigation system in a further embodiment of the present invention.

Referring now to FIG. 14, therein is shown a flow chart of a method 1400 of operation of the navigation system 100 in a further embodiment of the present invention. The method 1400 includes: receiving an entry for a destination in a block 1402; identifying a category of interest for the destination in a block 1404; generating a route to the destination in a block 1406; recognizing a traveling context for traveling along the route to the destination in a block 1408; and generating an en-route notification based on matching a delivery profile to the category of interest for traveling within the traveling context for displaying on a device in a block 1410.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving an entry for a destination;
   identifying a category of interest for the destination;
   generating a route to the destination;
   recognizing a traveling context for traveling along the route to the destination;
   generating an en-route notification based on matching a delivery profile to the category of interest for traveling within the traveling context for displaying on a device; and
   extrapolating, with a control unit, an acceptance trend based on the notification.

2. The method as claimed in claim 1 wherein:
   receiving the entry includes receiving a category of interest;
   identifying the category of interest includes identifying the destination for the category of interest; and
   generating the en-route notification includes generating the en-route notification reflecting a travel type related to the destination.

3. The method as claimed in claim 1 further comprising:
   receiving a notification acceptance for the en-route notification;
   identifying an intermediate stop for the notification acceptance prior to reaching the destination; and
   updating the route for reaching the intermediate stop.

4. The method as claimed in claim 1 further comprising:
   receiving a notification acceptance for the en-route notification;
   extrapolating the acceptance trend based on the notification acceptance; and
   generating an updated notification based on the acceptance trend for reflecting a travel type related to the destination.

5. The method as claimed in claim 1 further comprising:
   detecting a non-response for the en-route notification based on meeting or exceeding a time threshold, an occurrence of an event, or a combination thereof; and
   generating an updated notification based on the non-response for reflecting a travel type related to the destination.

6. A method of operation of a navigation system comprising:
   receiving an entry for a destination;
   identifying a category of interest for the destination;
   generating a route to the destination;
   identifying a travel type for the destination;
   recognizing a traveling context based on the travel type for traveling along the route to the destination;
   generating an en-route notification based on matching a delivery profile to the category of interest for traveling within the traveling context;
   receiving a notification acceptance for the en-route notification;
   extrapolating, with a control unit, an acceptance trend based on the notification acceptance; and
   updating the route for reaching an intermediate stop based on the notification acceptance for displaying on a device.

7. The method as claimed in claim 6 further comprising:
   receiving the notification acceptance for the en-route notification; and
   generating an updated notification based on the notification acceptance for reflecting a travel type related to the destination.

8. The method as claimed in claim 6 further comprising:
   receiving a notification rejection for the en-route notification;
   extrapolating a rejection trend based on the notification rejection; and
   generating an updated notification based on the rejection trend for reflecting a travel type related to the destination.

9. The method as claimed in claim 6 further comprising:
   receiving a notification rejection for the en-route notification; and
   generating an updated notification based on the notification rejection for reflecting a travel type related to the destination.

10. The method as claimed in claim 6 further comprising:
    detecting a non-response for the en-route notification;
    extrapolating a non-response trend based on the non-response; and
    generating an updated notification based on the non-response trend for reflecting a travel type related to the destination.

11. The method as claimed in claim 6 further comprising:
    detecting a non-response for the en-route notification; and
    generating an updated notification based on the non-response for reflecting a travel type related to the destination.

12. The method as claimed in claim 6 further comprising:
    generating a ranking for the en-route notification; and
    wherein generating the en-route notification includes generating the en-route notification according to the ranking for meeting a travel type.

13. The method as claimed in claim 6 further comprising:
    updating the traveling context based on updating the route; and
    generating an updated notification based on the traveling context for reflecting a travel type related to the intermediate stop.

14. A navigation system comprising:
    a first user interface for receiving an entry for a destination; and
    a control unit, coupled to the first user interface, for:
       identifying a category of interest for the destination,
       generating a route to the destination,
       recognizing a traveling context for traveling along the route to the destination,
       generating an en-route notification based on matching a delivery profile to the category of interest for traveling within the traveling context for displaying on a device, and extrapolating an acceptance trend based on the notification.

15. The system as claimed in claim 14 wherein:
the first user interface is for receiving the entry for the category of interest;
the control unit is for:
identifying the destination for the category of interest, and
generating the en-route notification based on the category of interest for reflecting a travel type related to the destination.

16. The system as claimed in claim 14 wherein the control unit is for:
receiving a notification acceptance for the en-route notification;
identifying an intermediate stop for the notification acceptance prior to reaching the destination; and
generating an updated notification based on the intermediate stop for traversing the route for reaching the intermediate stop.

17. The system as claimed in claim 14 wherein the control unit is for:
receiving a notification acceptance for the en-route notification;
extrapolating the acceptance trend based on the notification acceptance; and
generating an updated notification based on the acceptance trend for reflecting a travel type related to the destination.

18. The system as claimed in claim 14 wherein the control unit is for:
detecting a non-response for the en-route notification based on meeting or exceeding a time threshold, an occurrence of an event, or a combination thereof; and
generating an updated notification based on the non-response for reflecting a travel type related to the destination.

19. The system as claimed in claim 14 wherein the control unit is for:
identifying a travel type based on the route;
recognizing a traveling context based on the travel type for traveling along the route to the destination;
receiving a notification acceptance for the en-route notification; and
updating the route for reaching an intermediate stop based on the notification acceptance for displaying on a device.

20. The system as claimed in claim 19 wherein the control unit is for:
receiving the notification acceptance for the en-route notification; and
generating an updated notification based on the notification acceptance for reflecting a travel type related to the destination.

21. The system as claimed in claim 19 wherein the control unit is for:
receiving a notification rejection for the en-route notification;
extrapolating a rejection trend based on the notification rejection; and
generating an updated notification based on the rejection trend for reflecting a travel type related to the destination.

22. The system as claimed in claim 19 wherein the control unit is for:
receiving a notification rejection for the en-route notification; and
generating an updated notification based on the notification rejection for reflecting a travel type related to the destination.

23. The system as claimed in claim 19 wherein the control unit is for:
detecting a non-response for the en-route notification;
extrapolating a non-response trend based on the non-response; and
generating an updated notification based on the non-response trend for reflecting a travel type related to the destination.

24. The system as claimed in claim 19 wherein the control unit is for:
detecting a non-response for the en-route notification; and
generating an updated notification based on the non-response for reflecting a travel type related to the destination.

25. The system as claimed in claim 19 wherein the control unit is for:
generating a ranking for the en-route notification; and
generating the en-route notification based on the ranking for meeting a travel type.

26. The system as claimed in claim 19 wherein the control unit is for:
updating the traveling context based on updating the route; and
generating an updated notification based on the traveling context for reflecting a travel type related to the intermediate stop.

* * * * *